United States Patent
Gaudig et al.

(10) Patent No.: US 9,010,831 B2
(45) Date of Patent: Apr. 21, 2015

(54) MOTOR VEHICLE WITH AN ADJUSTABLE LOADING PANEL IN A CARGO SPACE

(71) Applicant: GM Global Technology Operations LLC, Detroit, MI (US)

(72) Inventors: Ralf Gaudig, Ruesselsheim (DE); Werner Berhard, Nauheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/797,450

(22) Filed: Mar. 12, 2013

(65) Prior Publication Data

US 2013/0270858 A1 Oct. 17, 2013

(30) Foreign Application Priority Data

Apr. 11, 2012 (DE) .......................... 10 2012 007 093

(51) Int. Cl.
*B60R 7/00* (2006.01)
*B60R 5/04* (2006.01)

(52) U.S. Cl.
CPC ........................................ *B60R 5/04* (2013.01)

(58) Field of Classification Search
CPC ...... B60R 5/04; B60R 5/041; B60R 2013/01; B62D 33/027; B62D 33/0273; B62D 25/2054; B60P 1/6436; B60P 1/6454
USPC ................. 296/26.08–26.11, 37.16; 224/564; 414/522, 462
See application file for complete search history.

(56) References Cited

U.S. PATENT DOCUMENTS

| | | | | |
|---|---|---|---|---|
| 2,576,385 A | * | 11/1951 | Bigsby ........................ | 224/496 |
| 2,797,828 A | * | 7/1957 | Fritsche ....................... | 414/522 |
| 7,188,881 B1 | * | 3/2007 | Sturt et al. ................... | 296/26.1 |
| 7,201,418 B2 | * | 4/2007 | Bartos et al. ............... | 296/26.01 |
| 7,416,234 B2 | * | 8/2008 | Bequette .................... | 296/26.09 |
| 2008/0157555 A1 | * | 7/2008 | Steele et al. ............... | 296/26.09 |

FOREIGN PATENT DOCUMENTS

| | | |
|---|---|---|
| DE | 1918995 U | 7/1965 |
| DE | 10241687 A1 | 3/2004 |
| DE | 102010063819 A1 | 6/2012 |
| DE | 102011009210 A1 | 7/2012 |
| EP | 1932721 A2 | 6/2008 |

OTHER PUBLICATIONS

Machine translation of the Joachim et al. document, DE1918995.*
German Patent Office, German Patent Search Report for Application No. DE 102012007093.4, filed on Jan. 22, 2013.

* cited by examiner

*Primary Examiner* — Dennis H Pedder
(74) *Attorney, Agent, or Firm* — Ingrassia Fisher & Lorenz, P.C.

(57) ABSTRACT

A motor vehicle with a cargo space situated behind a seat arrangement and an adjustable loading panel arranged inside the cargo space is provided. Guides for adjustably accommodating the loading panel are located in the cargo space. Mounted in the loading panel is an actuating handle, which can be moved through exposure to a spring action for swiveling at least one eccentric mounted in the loading panel out of a position that fixes the loading panel in place into a position that releases the loading panel for adjustment purposes, and for adjusting the loading panel. The configuration makes it possible to ergonomically load the cargo space with the continuous adjustment and automatic braking of the loading panel.

18 Claims, 3 Drawing Sheets

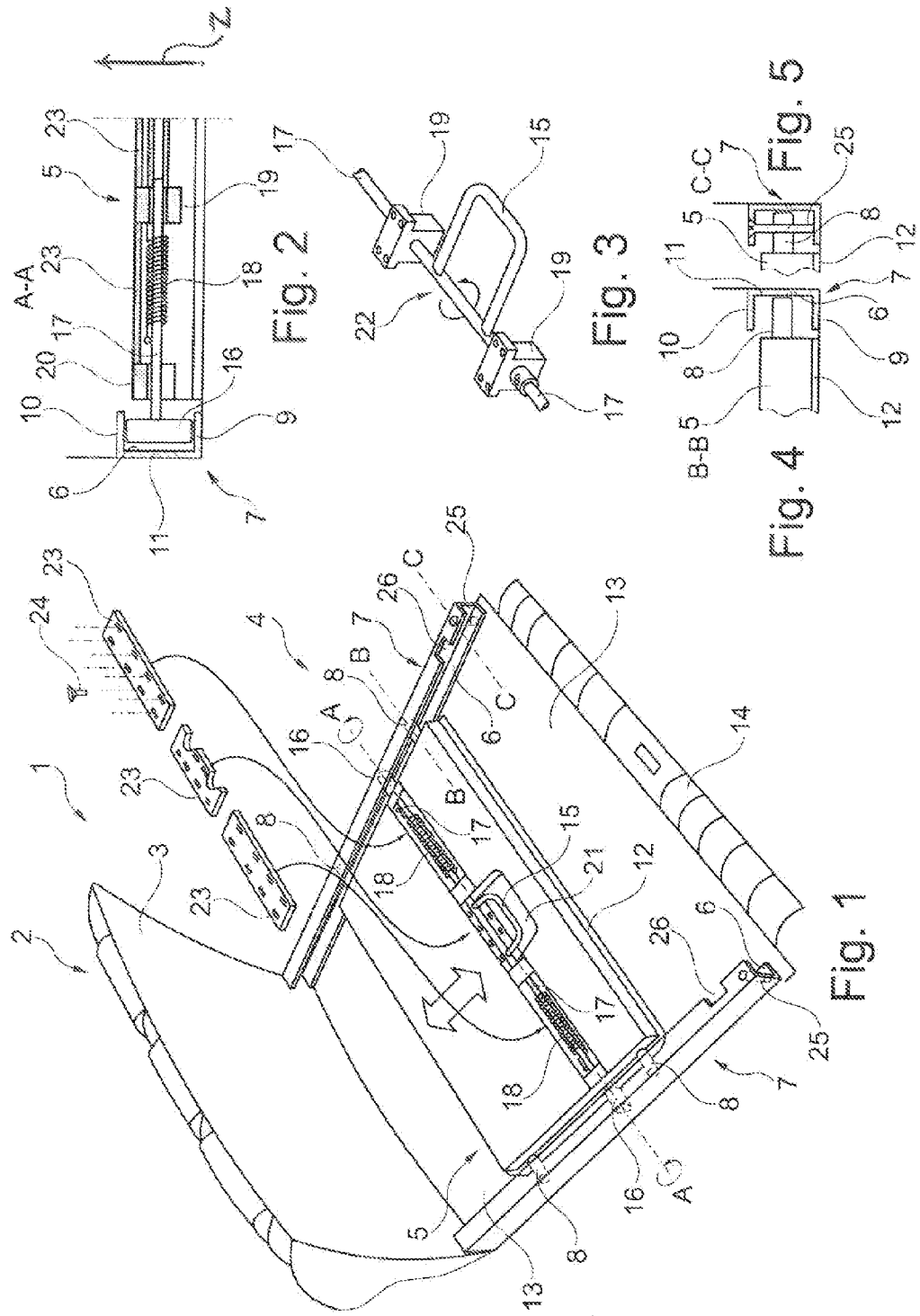

MOTOR VEHICLE WITH AN ADJUSTABLE LOADING PANEL IN A CARGO SPACE

CROSS-REFERENCE TO RELATED APPLICATION

This application claims priority to German Patent Application No. 10 2012 007 093.4, filed Apr. 11, 2012, which is incorporated herein by reference in its entirety.

TECHNICAL FIELD

The technical field relates to a motor vehicle with a cargo space situated behind a seat arrangement, and to an adjustable loading panel arranged inside the cargo space.

BACKGROUND

Known in the art are vehicles, in particular passenger cars, in which a cargo space is located behind a seat arrangement, inside of which is situated an adjustable loading panel. Involved here in particular are station wagons with a tailgate to be opened, making the cargo space accessible from the back. In order to be able to ergonomically load and unload the cargo space, the loading panel can be adjusted beyond the rear edge of the motor vehicle, so that loading and unloading can take place in this position. All that then still has to be done is to move the loaded or unloaded loading panel forward until it is completely inside the cargo space.

Known from DE 102 41 687 A1 is a motor vehicle with a cargo space situated behind a seat arrangement, and an adjustable loading panel arranged inside the cargo space. Both sides of the vehicle, meaning both sides of the cargo space, exhibit guides located therein for adjustably accommodating the loading panel. Locking bolts are used to lock the loading panel with guide rails in particular in the inserted position of the loading panel. The locking bolts can be unlocked through respective actuation with a Bowden cable. The respective Bowden cable is connected with an actuating handle integrated into the loading panel. The actuating handle converts a pivoting motion executed by the user into a pulling movement acting on the Bowden cables. After the locking bolt has been switched to its unlocked position, the loading panel can be moved in the guide rails. A spring action causes the actuating handle to swivel back when released, and the locking bolts exposed to the effect of the spring come into contact with the guide rails in the unlocked position. When the loading panel is adjusted, the spring action causes the locking bolts to latch with latching recesses in the guide rails once the loading panel has reached the retracted position. As a consequence, the loading panel is latched in relation to the guide rails only in this defined position or in prescribed, defined positions.

In addition, other objects, desirable features and characteristics will become apparent from the subsequent summary and detailed description, and the appended claims, taken in conjunction with the accompanying drawings and this background.

SUMMARY

The present disclosure provides a motor vehicle that ensures an ergonomic loading of the cargo space with the continuous adjustment and automatic braking of the loading panel.

In the motor vehicle according to the present disclosure, the cargo space is situated behind the seat arrangement, and the loading panel can be adjusted inside the cargo space. The loading space integrates the guides for adjustably accommodating the loading panel. Further provided is an actuating handle, which is mounted in the loading panel, and movable through exposure to a spring action. It is used to swivel at least one eccentric mounted in the loading panel out of a position that fixes the loading panel in place into a position that releases the loading panel for adjustment purposes. The actuating handle is also used for adjusting the loading panel.

As a result, the configuration according to the present disclosure makes it possible to release the at least one eccentric from the position that fixes the loading panel in place when the actuating handle is activated through exposure to a spring action. As the user continues to grip the actuating handle and apply a force to the actuating handle in the adjustment direction of the loading panel, in particular toward the rear, the loading panel can be adjusted. If the actuating handle is released, with the loading panel either stationary or moving, the eccentric exposed to the spring is switched into a position in which the eccentric fixes the loading panel in place. If the loading panel moves, this causes the loading panel to brake when the spring acts on the eccentric. By contrast, if the loading panel is not moved, the loading panel is fixed in this position when the spring acts on the eccentric.

As a consequence, the configuration of the motor vehicle according to the present disclosure makes it possible to adjust and automatically brake the loading panel.

The actuating handle can generally be used to swivel two eccentrics arranged on either side of the motor vehicle. This ensures that the eccentrics are effective on both sides of the loading panel, so that the loading panel can be decelerated or immobilized on either side of the loading panel.

For example, the eccentric is designed as a cam.

The respective eccentric generally exhibits a logarithmic characteristic. The logarithmic characteristic ensures that the wedge angle of the eccentric or cam remains constant at any swivel angle. As a result, the same braking power is always on hand regardless of tolerance.

An especially simple structural accommodation of the actuating handle and simple linkage of the actuating handle to the respective eccentric can be achieved by mounting the actuating handle in the loading panel so that it can swivel around an axis, and securing it in a torque-proof manner with the respective eccentric by way of a shaft. In particular, it is provided that the shaft passes through a coil spring or spiral spring, wherein the coil spring or spiral spring is joined with the shaft at one end, and with the loading panel at the other end. The respective eccentric or respective cam is exposed to the spring action of the swivel pin, thereby switching the eccentric or cam to the clamping position for fixing the loading panel in place relative to the guides accommodating the loading panel.

The shaft is generally mounted in such a way as to accommodate it in the loading panel by means of a locating bearing in the area of the end facing the actuating handle, and by means of a floating bearing in the area of the end facing the eccentric. When using two eccentrics, two shafts are therefore provided, which are generally synchronized to each other at the actuating handle by means of a respective tolerance compensating device. The shafts on the right and left sides are thus decoupled when connected with the actuating handle.

In a final position with the spring preloaded, the actuating handle is generally swiveled into a recess on the upper side of the loading panel. Due to the preloading, the spring generates the braking force. For example, each spring generates a torque of approx. 1 Nm. In particular, the spring has an extremely long overall length, which results in flat spring characteristics, so that the operating force rises insignificantly during actuation from a comfort standpoint. In the mentioned swiveled-in position, cargo can be moved on the loading panel without colliding with the actuating handle.

In particular, the loading panel is mounted in such a way that guide rails exhibit the guides for adjustably accommodating the loading panel and/or the lower side of the loading panel comprising the guide rests directly on a flat loading floor.

In particular, the respective guide rail is designed in such a way as to exhibit a U-shaped profile. The U-shaped profile of the guide rail is open toward the other guide rail. The loading panel here exhibits guide bolts on either side, which ensure that the loading panel is smoothly guided in the guide rails.

It is viewed as advantageous for the respective cam to contact the facing guide rail when positioned to fix the loading panel in place. As a consequence, the loading panel is fixed in place indirectly, i.e., via the cam(s) in the guide rail or guide rails.

In order to ensure that the loading panel is reliably secured in the guide rails, it is provided that, When positioned to fix the loading panel in place, the respective cam contacts facing guide rail exhibiting the U-shaped profile in the area of its upper and lower leg. The respective cam thus becomes clamped top and bottom on the allocated legs of the guide legs.

One exemplary embodiment provides a flexible braking belt. In particular, the latter is situated parallel to the guides. The braking belt is immovably mounted in the area of its averted ends. In a first position that releases the loading panel for adjustment purposes, the eccentric is not in contact with the braking belt, which is then straightly arranged. The eccentric is moved from this first position into a second position, opposite the braking belt. In the latter, the abutment of the eccentric against the braking belt makes it harder to adjust the loading panel. In order to be able to adjust the loading panel, higher frictional forces between the eccentric and braking belt must basically be overcome. When being switched into its second position, the eccentric generally deforms the braking belt away from the swivel axis of the eccentric. This larger deformation of the braking belt induces a higher contact pressure between the eccentric and braking belt, and hence yields elevated frictional forces, which are required for adjusting the loading panel in relation to the braking belt.

It is basically also possible to establish a fixed connection between the loading panel and braking belt, so that once the actuating handle has been released and the at least one eccentric has been swiveled, no relative movement by the loading panel and braking belt can take place. For example, this is achieved by the eccentric deforming the side of the braking bell facing away from the swiveling axis of the eccentric against a stop of the loading panel, and clamping it there between the eccentric and loading panel.

The ends on one of the two guide rails or as a general rule on both guide rails exhibit stops that prevent an unintended withdrawal of the loading panel, i.e., out of the guide rails in the longitudinal extension of the motor vehicle. In order to disassemble the loading panel, it is provided that these stops be removed, allowing the loading panel to be pulled further toward the rear. This makes it possible to adjust the cam position in alignment with a congruent window, in particular a section in the leg of the guide rail exhibiting the U-profile. In this position, the loading panel can either be withdrawn completely toward the back for disassembly, or swiveled around the front rotational axis, which is formed in particular by the front guide bolts, pushed forward toward the seatback of the rear row of seats, and there fixed into a inoperative position.

The configuration of the motor vehicle according to the present disclosure makes it possible to ergonomically load the cargo space by adjusting the loading panel. The components relating to the loading panel and its arrangement are inexpensive to manufacture, and only add slightly more weight.

The loading panel can be continuously adjusted and automatically decelerated. The loading panel and parts supporting the latter can be built into the motor vehicle after the fact. This is advantageous as an after-sales solution, and hence from an economic standpoint as well.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 illustrates for one exemplary embodiment a cargo space area with the adjustable loading panel, FIG. 2 is a section according to line A-A on FIG. 1 through the mounting area for the shaft, the spring acting on the shaft, and the eccentric connected with the shaft, FIG. 3 is a view of the mounting area of the actuating handle;

FIG. 4 is a section according to line R-B on FIG. 1 through the area of the guide bolt and the guide rail allocated thereto;

FIG. 5 is a section according to line C-C on FIG. 1 through the area of the guide rail and the removable stop;

DETAILED DESCRIPTION

Figures 6, 7:
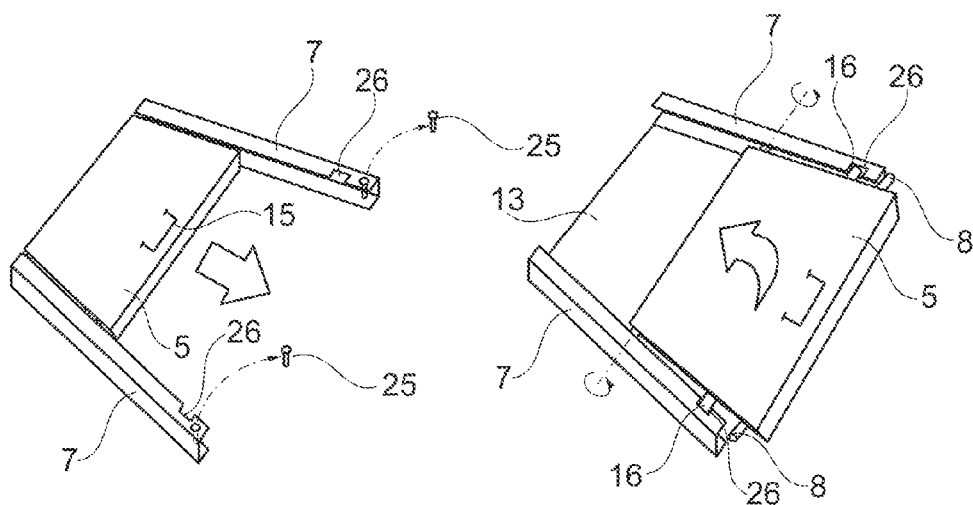
FIG. 6 is the arrangement of guide rails and loading panel with the loading panel pushed completely toward the front.
FIG. 7 is the arrangement according to FIG. 6 with the rear stops removed, and the loading panel slightly extended over the rear end of the guide rails.

The following detailed description is merely exemplary in nature and is not intended to limit the present disclosure or the application and uses of the present disclosure. Furthermore, there is no intention to be bound by any theory presented in the preceding background or the following detailed description.

For a motor vehicle 1, FIG. 1 shows a cargo space 4 situated behind a rear seat arrangement 2, specifically its backrest 3. Located within the cargo space 4 is an adjustable loading panel 5. The cargo space 4 incorporates lateral guides 6 for adjustably accommodating the loading panel 5 on either side of the motor vehicle 1 in relation to the longitudinal orientation or forward traveling direction of the motor vehicle. Two guide rails 7 arranged parallel to each other and horizontally exhibit the guides 6. The respective guide rail 7 has a U-shaped profile, which is open toward the other guide rail 7.

Both sides of the loading panel 5 exhibit guide bolts 8 front and back, meaning four guide bolts 8, which are guided in the two guide rails 7. The respective guide rail 7 exhibits a lower leg 9, an upper leg 10 and a web 11 that joins the two legs. The webs 11 of the guide rails 7 that exhibit the guides 6 are arranged parallel to each other.

The lower side of the loading panel 5 is flat, and exhibits a low-friction surface, illustrated by reference number 12. The latter comprises the vertical guide of the loading panel 5. As a consequence, the loading panel 5 sits on a flat loading floor 13 of the cargo space 4 in the area of this surface 12. The latter extends from the backrest 3 up to an end plate 14 that closes the cargo space 4 from the back.

The motor vehicle 1 is designed as a passenger car, in one example, as a station wagon. In the locked state, the lockable tailgate is situated with its lower end adjacent to the end plate 14.

The loading panel 5 incorporates an actuating handle 15 that can be moved through exposure to a spring action, namely essentially in the rear, central area of the loading panel 5. This actuating handle 15 is used to swivel two eccentrics 16 indirectly mounted in the loading panel 5, which are designed as cams. The respective eccentric exhibits a logarithmic characteristic.

The actuating handle 15 can be used to swivel the two eccentrics 16 from a position that fixes the loading panel 5 in place relative to the two guide rails 7 into a position that releases the loading panel for adjustment purposes, wherein the loading panel 5 can be adjusted with the actuating handle 15 in this position. This generally takes place with the actuating handle 15 by having a person standing behind the end plate 14 pull it back.

The actuating handle 15 is mounted in the loading panel 5 so that it can swivel around the axis A-A depicted on FIG. 1, and joined with the respective eccentric 16 by means of a shaft 17. The respective shaft 17 here passes through a coil spring 18, whose one end is connected with the shaft 17, and whose other end is joined with the bearing 19 for the shaft 17 allocated to the loading panel 5, as may be gleaned from FIG. 2. Specifically, the respective shaft 17 is mounted in the loading panel 5 in the area of the end facing the actuating handle 15 by means of a locating bearing 19, and in the loading panel 5 in the area of the end facing the eccentric 16 by means of a floating bearing 20, which releases the shaft 17 in the Z-direction.

In the area of the actuating handle 15, the loading panel 5 is provided with a recess 21 in the area of its upper side. In a final position with the coil spring S preloaded, the actuating handle 15 is swiveled into this recess 21 The two shafts 17 are synchronized to each other on the actuating handle 15 by a tolerance compensating device 22. The latter decouples the shafts 17 on the left and right side, and ensures that full use is made of the two eccentrics 16.

In the area of the tolerance compensating device 22 and the area of the two coil springs 18, hollow spaces for accommodating the corresponding functional parts are covered by cover plates 23. The latter are depicted on FIG. 1 prior to their assembly. The cover plates 23 are secured by means of screws 24.

If the actuating handle 15 is not gripped, it is acted upon by the coil springs 18, which swivel it into its mentioned final position, in which the actuating handle 15 is swiveled into the recess 21. During exposure to the two springs 18, the two shafts 17 along with the allocated eccentrics 16 are swiveled in such a way that the respective eccentric 16 abuts against both the lower leg 9 and upper leg 10 of the allocated guide rail 7 with the spring acting as a swivel pin spring preloaded, as evident from FIG. 2. As a result, the eccentric 16 becomes clamped in relation to the guide rail 7, so that the loading panel 5 cannot be adjusted in the guide rails 7.

In order to release this fixed position of the loading panel 5, the actuating handle 15 is gripped, for example starting in the position depicted on FIG. 1, and swiveled out of the recess 21 against the allocated cover plate 23. The rotational motion of the actuating handle 15 is transmitted to the shafts 17, correspondingly swiveling the eccentrics 16 out of contact with the legs 9 and 10 of the allocated guide rail 7. During this swiveling motion of the actuating handle 15, the two coil springs 18 are preloaded more strongly. If a force in the direction of the end plate 14 is exerted on the actuating handle 15 in this swiveling position, it causes the loading panel 5 to be pulled in the direction of the end plate 14. If the actuating handle 15 is released during this travel by the loading panel 5, the preloaded coil springs 18 cause the eccentrics 16 to independently switch into their fixed position according to FIG. 2 in relation to the two guide rails 7. This directly interrupts the traveling motion of loading panel 5, and thus brakes the loading panel 5.

The loading panel 5 can be displaced in the direction of the backrest 3 in the same way.

As illustrated on FIG. 5, a bolt 25 is inserted into mutually aligned boreholes in the legs 9 and 10 in the rear area of the respective guide rail 7, and represents a removable stop for the loading panel 5 during rearward movement. Further, the upper leg 10 of the respective guide rail 7 exhibits a recess 26 open toward the other guide rail 7 at the same distance to the rear end of the guide rails 7. The latter is provided for passage by the eccentric 16 upwardly out of the guide rails 7.

Figures 8, 9:
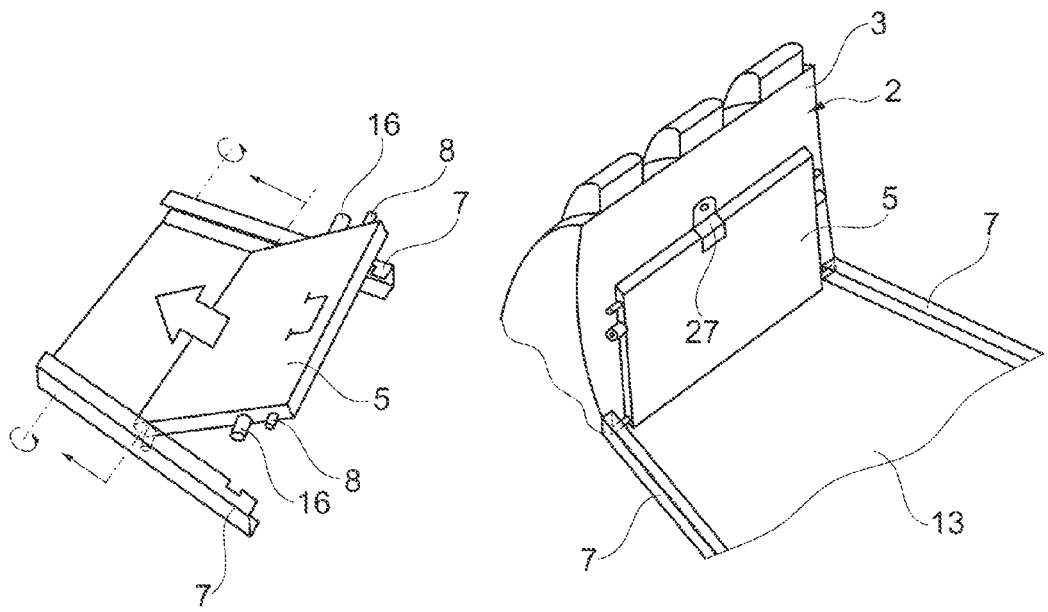
FIG. 8 proceeding from the state according to FIG. 7, is the bearing panel swiveled up and toward the back around its front guide bolt.
FIG. 9 proceeding from the depiction according to FIG. 8, is the loading panel moved toward the front, which is swiveled against the rear wall of the backrest of the rear seat arrangement.

FIG. 6 illustrates the arrangement of the two guide rails 7 and loading panel 5 with loading panel 5 pushed maximally toward the front, so that it is arranged adjacent to the backrest 3 of the seat arrangement 2 in this position. As depicted on FIG. 6, once the two bolts 25 have been removed, the loading panel 5 can be displaced in the rearward direction toward the rear end of the guide rails 7 after the actuating handle 15 has been activated and a tensile force has been applied to the latter, specifically until the two rear guide bolts 8 exit the guide rails 7 and the two eccentrics 16 are arranged under the recesses 26. This is illustrated on FIG. 7. Proceeding from this state, the loading panel 5 can be swiveled around the two front guide bolts 8, which are mounted in the guide rails 7, thereby lifting the rear end of the loading panel 5. This state is shown on FIG. 8. Proceeding from the latter, the loading panel 5 that continues to be guided via the front guide bolts 8 in the guide rails 7 can be displaced toward the front up until the backrest 3, and the loading panel 5 can then be flatly swiveled against the backrest 3. In this position, the loading panel 5 can be held against the backrest 3 by a retaining strap 27.

The bolts 25 are usually not removed, so that hey limit the rearward movement of the loading panel 5.

Figure 10:
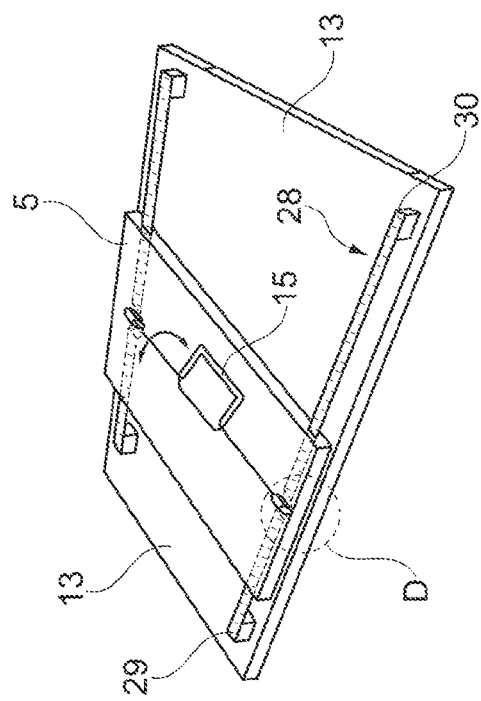
FIG. 10 for one exemplary embodiment is a view of the loading floor and braking belts mounted therein, as well as of the loading panel interspersed by the braking belts.

For another exemplary embodiment, FIG. 10 proceeds from the basic description for the prior exemplary embodiment according to FIGS. 1 to 9, and illustrates the flat loading floor 13 for the motor vehicle I, on which the loading panel 5 flatly rests. The mechanism comprised of the actuating handle 15, tolerance compensating device 22, shafts 17, coil springs 18, bearing 19, bearing 20 and eccentric 16 has the same configuration as the one in the prior exemplary embodiment.

Arranged parallel to each other and oriented in the longitudinal direction of the motor vehicle 1, two braking belts 28 are incorporated into the loading floor 13 on either of its sides. The respective braking belt 28 is comprised of a cable or band. In the area of its front end 29 and in the area of its rear end 30, the braking belt 28 is mounted in bearing elements 31, which are situated above the loading floor 13 and rigidly secured thereto. The respective braking belt 28 is held in the two bearing elements 31 under a preload. In particular, the braking belt 28 is slightly flexible or elastic.

On the allocated side of the loading panel 5, the respective braking belt 28 passes through a channel 32 in the loading panel 5. This channel expands in the area of the eccentric 16 allocated to this side of the loading panel 5. On the side of the braking belt 28 facing away from the eccentric 16, the channel cross section is somewhat tapered owing to the projection 33 of the loading panel 5.

Figure 11:
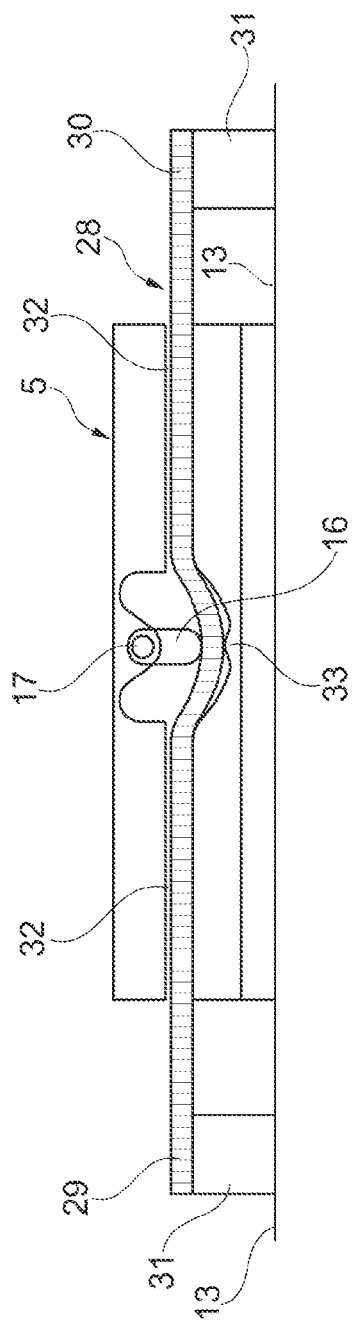
FIG. 11 is a detailed view of the area D on FIG. 10.

If the actuating handle 15 is not gripped as described in the prior exemplary embodiment, the eccentrics 16 are in the clamped position in the current exemplary embodiment as illustrated on FIG. 11, in which the eccentric 16 is moved against the otherwise straightened braking belt 28, moving the latter in the direction of the projection 33 against the latter. As a result, the respective braking belt 28 is clamped between the allocated eccentric 16 and the allocated projection 33. The loading panel 5 can thus not be adjusted relative to the loading floor 13. This only becomes possible when the actuating handle 15 is gripped, and hence swiveled, and, as described for the prior exemplary embodiment, the eccentrics 16 are swiveled out of the position depicted on FIG. 11 and into a position in which the respective eccentric 16 is no longer engaged with the braking belt 28 or only abuts against the braking belt 28 with so slight a frictional engagement that the loading panel 5 can be adjusted relative to the braking belt 28. When the actuating handle 15 is released, exposure to the spring action causes the eccentrics 16 to again switch into their clamped position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle, comprising:
a cargo space situated behind a seat arrangement;
an adjustable loading panel arranged inside the cargo space, the adjustable loading panel including guides, at least one eccentric, and a first spring loaded shaft with a distal end connected to the at least one eccentric, the at least one eccentric being movable to releasably fix a position of the loading panel within the cargo space; and
an actuating handle mounted on the spring loaded shaft and configured to swivel the at least one eccentric out of a position that fixes the loading panel in place into a position that releases the loading panel for adjustment, wherein the actuating handle is mounted in the loading panel so that it swivels around an axis of the spring loaded shaft, and is secured to the first spring loaded shaft and a second spring loaded shaft, wherein the first spring loaded shaft and the second spring loaded shaft are synchronized to each other by means of a tolerance compensating device.

2. The motor vehicle according to claim 1, wherein the actuating handle swivels two eccentrics arranged on either side of the motor vehicle.

3. The motor vehicle according to claim 1, wherein at least one of the first or second spring loaded shafts passes through a coil spring or spiral spring, wherein the coil spring or spiral spring is joined with the at least one of the shafts at one end, and with the loading panel at the other end.

4. The motor vehicle according to claim 3, wherein the at least one of the shafts is mounted in the loading panel in the area of the end facing the actuating handle by means of a locating bearing, and in the loading panel in the area of the end facing the eccentric by means of a floating bearing.

5. The motor vehicle according to claim 1, wherein, in a final position with the spring preloaded, the actuating handle is swiveled into a recess on the upper side of the loading panel.

6. The motor vehicle according to claim 1, wherein the guides comprise guide rails for adjustably accommodating the loading panel.

7. The motor vehicle according to claim 1, wherein the guides for adjustably accommodating the loading panel is established through contact between a lower surface of the loading panel and a locating surface of a loading floor.

8. The motor vehicle according to claim 6, wherein the respective guide rail exhibits a U-shaped profile, which is open toward the other guide rail, wherein the loading panel exhibits guide bolts on either side, which are guided in the guide rails.

9. The motor vehicle according to claim 8, wherein the at least one eccentric contacts a respective one of the guide rails when in its position that fixes the loading panel in place.

10. The motor vehicle according to claim 9, wherein the at least one eccentric, when in its position that fixes the loading panel in place, contacts a respective one of the guide rails exhibiting a U-shaped profile in the area of the lower and upper leg of the respective one of the guide rails.

11. The motor vehicle according to claim 1, wherein the guides for adjustably accommodating the loading panel have arranged parallel to them at least one flexible braking belt, which is immovably mounted in the area of its averted ends, wherein the at least one eccentric is not in contact with the straightly arranged braking belt in a first position that releases the loading panel for adjustment purposes, and moved into the braking belt in a second position, in which it is harder to adjust the loading panel.

12. The motor vehicle according to claim 11, wherein the at least one eccentric, when being switched into its second position, deforms the braking belt away from a swivel axis of the at least one eccentric.

13. The motor vehicle according to claim 12, wherein the at least one eccentric comprises two eccentrics interacting with two braking belts that deform the side of the braking belt facing away from the swiveling axis of the eccentrics against a stop of the loading panel, and clamps it there between the eccentrics and loading panel.

14. The motor vehicle according to claim 8, wherein the guide rails each exhibit a removable stop for the loading panel or for one of the guide bolts of the loading panel in the area of the end facing away from the seat arrangement, and a respective one of the guide rails exhibits a recess for passage of the at least one eccentric in the area of its end facing away from the seat arrangement, in front of the removable stop.

15. A motor vehicle, comprising:
a cargo space situated behind a seat arrangement;
an adjustable loading panel arranged inside the cargo space, the adjustable loading panel including guides, at least one eccentric, and a first spring loaded shaft with a distal end connected to the at least one eccentric, the at least one eccentric being movable to releasably fix a position of the loading panel within the cargo space;
at least one flexible braking belt arranged parallel to the guides for adjustably accommodating the loading panel, wherein the at least one flexible braking belt is immovably mounted in the area of its averted ends, wherein the at least one eccentric is not in contact with the straightly arranged braking belt in a first position that releases the loading panel for adjustment purposes, and moved into the braking belt in a second position, in which it is harder to adjust the loading panel; and
an actuating handle mounted on the spring loaded shaft and configured to swivel the at least one eccentric out of a position that fixes the loading panel in place into a position that releases the loading panel for adjustment.

16. The motor vehicle according to claim 11, wherein the at least one eccentric, when being switched into its second position, deforms the braking belt away from a swivel axis of the at least one eccentric.

17. The motor vehicle according to claim 12, wherein the at least one eccentric comprises two eccentrics interacting with two braking belts that deform the side of the braking belt facing away from the swiveling axis of the eccentrics against a stop of the loading panel, and clamps it there between the eccentrics and loading panel.

18. The motor vehicle according to claim 8, wherein the guide rails each exhibit a removable stop for the loading panel or for one of the guide bolts of the loading panel in the area of the end facing away from the seat arrangement, and a respective one of the guide rails exhibits a recess for passage of the at least one eccentric in the area of its end facing away from the seat arrangement, in front of the removable stop.

\* \* \* \* \*